(12) United States Patent
Chinn et al.

(10) Patent No.: US 6,821,321 B2
(45) Date of Patent: Nov. 23, 2004

(54) COMBINED VAPOR AND PARTICULATE FILTER

(75) Inventors: Matthew Joseph Chinn, Swindon (GB); Laurence Anthony Pears, Salisbury (GB)

(73) Assignee: The Secretary of State for Defence in Her Britannic Majesty's Government of the United Kingdom of Great Britain and Northern Ireland (GB)

( * ) Notice: Subject to any disclaimer, the term of this patent is extended or adjusted under 35 U.S.C. 154(b) by 0 days.

(21) Appl. No.: 10/220,627

(22) PCT Filed: Feb. 28, 2001

(86) PCT No.: PCT/GB01/00836

§ 371 (c)(1), (2), (4) Date: Sep. 3, 2002

(87) PCT Pub. No.: WO01/66223

PCT Pub. Date: Sep. 13, 2001

(65) Prior Publication Data

US 2003/0019193 A1 Jan. 30, 2003

(30) Foreign Application Priority Data

Mar. 3, 2000 (GB) .............................. 0005037

(51) Int. Cl.$^7$ .......................... B01D 53/04; B01D 39/20
(52) U.S. Cl. .......................... 96/108; 55/385.1; 55/486; 55/524; 55/527; 55/DIG. 5; 55/DIG. 35; 442/349; 264/109; 264/118; 264/128; 264/DIG. 48; 156/256
(58) Field of Search ................................ 55/385.1, 486, 55/487, 524, 527, 528, DIG. 5, DIG. 33, DIG. 35; 442/349, 381, 391; 264/29.1, 29.2, 109, 113, 115, 118, 128, DIG. 48; 156/62.2, 62.4, 62.8, 256; 96/108

(56) References Cited

U.S. PATENT DOCUMENTS

| | | | |
|---|---|---|---|
| 4,181,513 A | | 1/1980 | Fukuda et al. |
| 4,495,030 A | * | 1/1985 | Giglia .......................... 55/527 |
| 4,765,812 A | | 8/1988 | Homonoff et al. |
| 5,187,584 A | | 2/1993 | Nishiki et al. |
| 5,399,423 A | * | 3/1995 | McCullough et al. ........ 444/349 |
| 5,976,471 A | * | 11/1999 | Simandl et al. ................ 55/527 |
| 6,315,806 B1 | * | 11/2001 | Torobin et al. ................ 55/527 |

FOREIGN PATENT DOCUMENTS

| | | |
|---|---|---|
| GB | 482137 | 3/1938 |
| GB | 2080120 | 2/1982 |
| JP | 2-171234 | 7/1990 |
| JP | 2-198631 | 8/1990 |
| SU | 2031668 | 3/1995 |
| WO | WO 85/03013 | 7/1985 |
| WO | WO 97/23246 | 7/1997 |

OTHER PUBLICATIONS

Database WPI Section Ch. Week 198733, Derwent Publication Ltd., London GB; An 1987–231919 XP002165203 & JP 62 155914 A (Toyo Roshi KK), Jul. 10, 1987 (1098–07–10) Abstract.*

(List continued on next page.)

*Primary Examiner*—Duane Smith
*Assistant Examiner*—Jason M. Greene
(74) *Attorney, Agent, or Firm*—Dean W. Russell; Kilpatrick Stockton LLP

(57) ABSTRACT

A personal respirator has a face mask and is provided with a filter unit comprising a canister housing contiguous layers of novel filter material. The filter material is suitable for both particulate and vapor filtration, and comprises a composite of first and second groups of chopped fibres, the fibres of the first group having a relatively large diameter (about $7 \times 10^{-6}$ m) and the second group having a relatively small diameter (about $0.5 \times 10^{-6}$ m).

15 Claims, 2 Drawing Sheets

OTHER PUBLICATIONS

Database WPI Section Ch. Week 198733, Derwent Publications Ltd., London, GB; An 1987–231919 XP002165203 & JP 62 155914 A (Toyo Roshi KK), Jul. 10, 1987 Abstract.

Database WPI Section Ch. Week 198606, Derwent Publications Ltd., London GB; AN–1985–034894, XP002165204 & JP 59 228918 A (Teijin Ltd. ), Dec. 22, 1984 Abstract.

* cited by examiner

COMBINED VAPOR AND PARTICULATE FILTER

CROSS-REFERENCE TO RELATED APPLICATIONS

This application claims priority to Great Britain Application No. 0005037.7 filed on Mar. 3, 2000 and International Application No. PCT/GB01/00836 filed on Feb. 28, 2001 and published in English as International Publication No. WO 01/66223A1 on Sep. 13, 2001, the entire contents of which are hereby incorporated by reference.

BACKGROUND OF THE INVENTION

This invention relates to filter material and is concerned with both the production and use of the material. Filter materials made of several different fibre types, including fibres with different diameter dimensions are already known in the art. Database WPI Section Ch, Week 198733 Derwent Publications Ltd, London reference AN 1987-231919 discloses a filter material comprising 20–60% active carbon fibre with a diameter less than $15 \times 10^{-6}$ m; 10–20% ultra thin glass fibre with a diameter of $0.2$–$0.5 \times 10^{-6}$ m; and 20–70% cellulose fibre. Database WPI Section Ch, Week 198506 Derwent Publications Ltd, London reference AN 1985-034894 discloses a filter material comprising 20% fibres with a diameter $0.1$–$3 \times 10^{-6}$ m eg K titanate fibre; 20% fibres with a diameter $5$–$15 \times 10^{-6}$ m eg polyethylene terephthalate; and 20% fibres with a diameter $20$–$50 \times 10^{-6}$ m eg polyethylene terephthalate. U.S. Pat. No. 4,765,812 discloses a filter material comprising 10–20% of a binder material, and 80–90% of a fibre mixture wherein the fibre mixture comprises 75–95% fibres with a diameter greater than or equal to $20 \times 10^{-6}$ m and 5–25% fibres with a diameter less than $3 \times 10^{-6}$ m.

BRIEF SUMMARY OF THE INVENTION

Material according to the invention is suitable for both particulate and vapour filtration.

As used herein, the term "vapour" includes air and gases.

According to one aspect of the invention, filter material suitable for both particulate and vapour filtration comprises a composite of first and second groups of fibres, the fibres of the first group having a relatively large diameter, and the fibres of the second group having a relatively small diameter.

Typically, the fibres of the first group have a diameter of about $7.0 \times 10^{-6}$ m and the fibres of the second group have a diameter of about $0.5 \times 10^{-6}$ m.

Also typically, the composite material contains about 70% (by mass) of first group fibres.

The fibres of the first group may comprise carbon fibres the fibres of the second group may comprise glass and/or carbon fibres.

According to a second aspect of the invention, a method of producing filter material of composite form suitable for both particulate and vapour filtration, comprises mixing together with binder, first and second groups of fibres, fibres of the first group having a relatively large diameter and fibres of the second group having a relatively small diameter.

The invention also comprises filter material produced by the foregoing method.

The invention further comprises a respirator provided with a filter unit incorporating the novel filter material.

The various aspects of the invention will now be described, by way of example only, with reference to the accompanying drawings wherein:

DETAILED DESCRIPTION OF THE INVENTION

Figure 1:
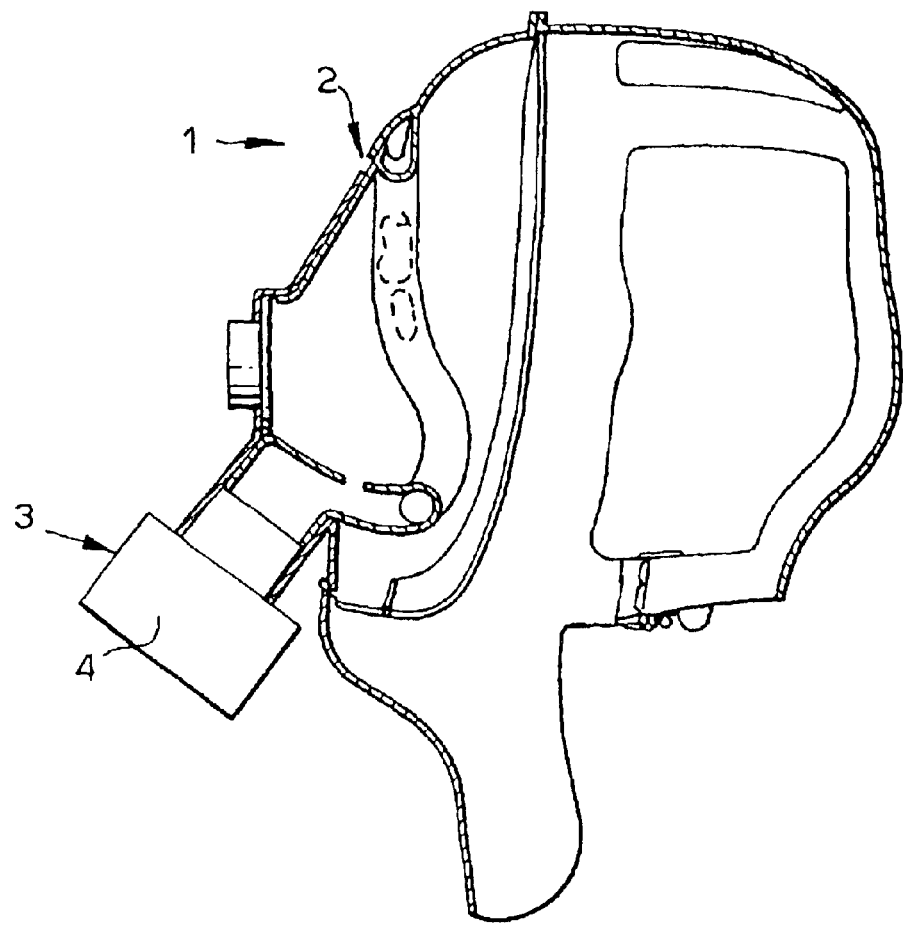
FIG. 1 is a side view of a respirator provided with a filter unit.
Figure 2:
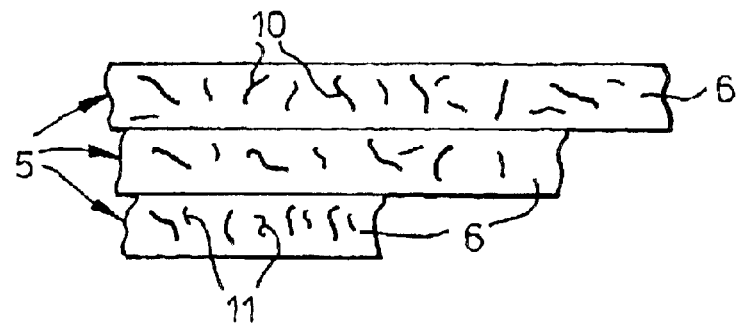
FIG. 2 is a cross-section of filter material employed by the filter unit.

FIG. 1 shows a personal respirator 1 of the form disclosed by GB 2,080,120 (Secretary of State for Defence), having a face mask 2, a filter unit 3 and a canister 4. By the current invention, canister 4 houses contiguous layers 5 of filter material 6 according to the invention (FIG. 2).

Filter material 6 is suitable for both particulate and vapour filtration, a comprises a composite of first and second groups 10, 11 of chopped fibres, the fibres of the first group 10 having a relatively large diameter (about $7.0 \times 10^{-6}$ m) and the fibres of the second group 11 having a relatively small diameter (about $0.5 \times 10^{-6}$ m).

The preferred range of fibre diameter is:

| First group | 6.0 to $14 \times 10^{-6}$ m |
|---|---|
| Second group | 0.1 to $1.0 \times 10^{-6}$ m |

Preferred length of fibres:

| First group | 1.0 mm to 6.0 mm |
|---|---|
| Second group | $100.0 \times 10^{-6}$ m to $200.0 \times 10^{-6}$ m |

First group fibres 10 of this example comprises Polyacrylonitrile (PAN) or pitch carbon fibres which have been activated by conventional steam or $CO_2$ activation methods so as to render them porous whereby they are capable of adsorbing high boiling point (say >50° C.) vapours. These fibres have also been chemically treated with impregnants so as to render them capable of adsorbing low (e.g. <50° C.) boiling point vapours. The fibres 10, which may be regarded as macrofibres, make up approximately 70% (by mass) of the composite material. The range of fibre mix may vary, with the fibres 10 of the first group ranging from 60% to 90% (by mass) and fibres 11 of the second group making up the remainder of the mass.

Fibres 11 of the second group, which may be regarded as microfibres, comprise vapour grown carbon (or glass) fibres.

The first group fibres filter vapours and the second group fibres filter particulates. By combining the two groups of fibres a combined vapour and particulate filter material results.

The dual role of the filter material results in a reduction in weight (when compared with conventional two filter units), as well as a reduction in breathing resistance, due to a lesser requirement for total filtration media.

Figure 3:
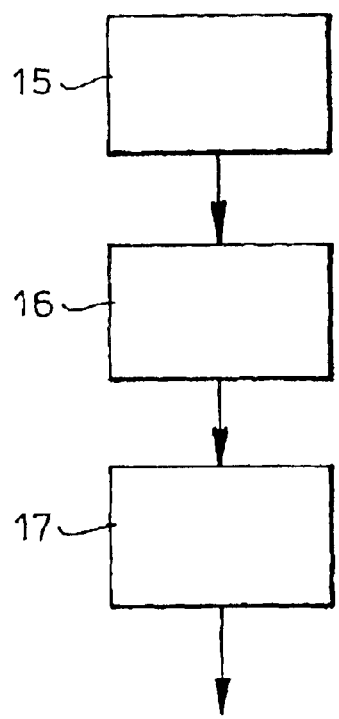
FIG. 3 is a flow chart illustrating manufacturing steps used in producing the filter material and FIGS. 4, 5 and 6 illustrate various forms of filter materials.

FIG. 3 illustrates how the filter material is produced.

The desired portions of first and second groups of fibres are mixed in a mixing vessel 15 together with water, soluble binder, such as sodium carboxymethyl cellulose or acrylic base binder and a viscosity modifier such as glycerol, which aids dispersion and ensures a substantially uniform mixture. The mixture is then passed to a sheet former 16, of the type used in the paper industry to make test samples. Water soluble binder (such as mentioned above) can be added to ensure that the subsequent composite has good mechanical properties.

If binder is added, the material is heated to 130° C. to 150° C. to cure the binder for 10–20 minutes.

Use of the former 16 results in composite filter material of mat form which is subsequently cut to size for incorporation as layers into the filter canister 4 of FIG. 1, using cutter 17.

Figure 4:
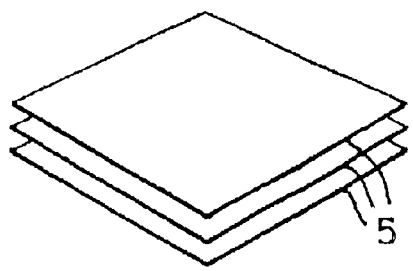
Figure 5:
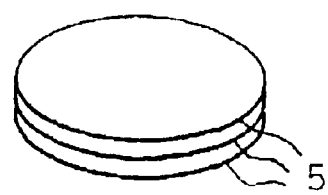
Figure 6:
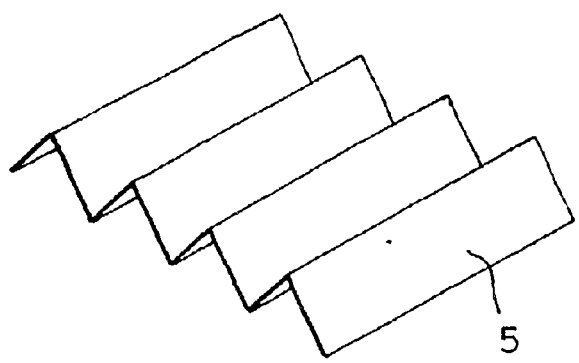

The composite material can be produced in mats of flat sheet form, such as rectangles (FIG. 4) or discs (FIG. 5). Alternatively, the mats may be pleated (FIG. 6). The finished shapes are produced so as to allow ease of integration in the respirator system.

EXAMPLES

1. Particulate Removal

A 25 g activated pitch carbon fibre mat has been produced that can remove 99.5% of NaCl particles (mean particle diameter $0.6 \times 10^{-6}$ m) when tested at a face velocity of 30 cc/min. The associated pressure drop is low, 0.9 mmH2O.

2. Vapour Removal

Activated pitch carbon fibres tested against hexane (concentration 4000 mg/m3@ 1l/min) in dry conditions (<5% relative humidity), and dry sample. Weight of carbon fibres is 0.8 g in a 2.5 cm brass sample tube. One of the activated carbon fibres did not display any hexane breakthrough until 63 minutes.

What is claimed is:

1. Filter material suitable for both particulate and vapour filtration comprising a composite of first and second groups of fibres, the fibres of the first group having a relatively large diameter and the fibres of the second group having a relatively small diameter, wherein the fibres of the first group have a range of 6.0 to $14.0 \times 10^{-6}$ m in diameter, wherein the fibres of the second group have a range of 0.1 to $1.0 \times 10^{-6}$ m in diameter and wherein the fibres of the first group and the fibres of the second group comprise carbon fibres.

2. Filter material as claimed in claim 1, wherein the fibres of the first group have a range of 1.0 mm to 6.0 mm in length.

3. Filter material as claimed in claim 1, wherein the fibres of the second group have a range of 100.0 to $200.0 \times 10^{-6}$ m in length.

4. Filter material as claimed in claim 1, wherein the fibres of the first group are about $7 \times 10^{-6}$ m in diameter.

5. Filter material as claimed in claim 1, wherein the fibres of the second group are about $0.5 \times 10^{-6}$ m in diameter.

6. Filter material as claimed in claim 1, wherein the fibres of the first group range from 60% to 90% by mass.

7. Filter material as claimed in claim 6, wherein the fibres of the first group comprise approximately 70% by mass.

8. Filter material as claimed in claim 1, wherein the fibres of the first group have been activated by conventional steam or $CO_2$ activation methods.

9. Filter material as claimed in claim 1, wherein the fibres of the first group have been chemically treated with impregnants.

10. A method of producing filter material of composite form suitable for both particulate and vapour filtration, comprising mixing both together, first and second groups of fibres, the fibres of the first group having a relatively large diameter and the fibres of the second group having a relatively mall diameter, wherein the fibres of the first group have a range of 6.0 to $14.0 \times 10^{-6}$ m diameter, wherein the fibres the second group have a range of 0.1 to $1.0 \times 10^{-6}$ m diameter, and wherein the fibres of the first group and the fibres of the second group comprise carbon fibres.

11. The method as claimed in claim 10, wherein a binder is mixed with the first and second group of fibres.

12. The method as claimed in claim 10, wherein the material is produced as sheets, subsequently cut to size for incorporation as layers in a respirator system.

13. A respirator provided with a filter unit incorporating a filter material comprising a composite of first and second groups of fibres, the fibres of the first group having a relatively large diameter and the fibres of the second group having a relatively small diameter, wherein the fibres of the first group have a range of 6.0 to $14.0 \times 10^{-6}$ m in diameter, wherein the fibres of the second group have a range of 0.1 to $1.0 \times 10^{-6}$ m in diameter and wherein the fibres of the first group and the fibres of the second group comprise carbon fibres.

14. Filter material as claimed in claim 2, wherein the fibres of the second group have a range of 100.0 to $200.0 \times 10^{-6}$ m in length.

15. The method as claimed in claim 11, wherein the material is produced as sheets, subsequently cut to size for incorporation as layers in a respirator system.

* * * * *